United States Patent [19]
Fink

[11] Patent Number: 5,283,795
[45] Date of Patent: Feb. 1, 1994

[54] DIFFRACTION GRATING DRIVEN LINEAR FREQUENCY CHIRPED LASER

[75] Inventor: David Fink, Los Angeles, Calif.

[73] Assignee: Hughes Aircraft Company, Los Angeles, Calif.

[21] Appl. No.: 871,877

[22] Filed: Apr. 21, 1992

[51] Int. Cl.$^5$ ............................................. H01S 3/13
[52] U.S. Cl. ..................... 372/32; 372/102; 372/20; 372/9; 372/25; 372/28
[58] Field of Search ................... 372/102, 20, 98, 108, 372/9, 33, 25, 28

[56] References Cited

U.S. PATENT DOCUMENTS

| | | | |
|---|---|---|---|
| 4,601,036 | 7/1986 | Faxvog et al. | 372/102 |
| 4,862,468 | 8/1989 | Fink | 372/102 |
| 4,868,834 | 9/1989 | Fox et al. | 372/102 |
| 4,873,692 | 10/1989 | Johnson et al. | 372/102 |
| 4,977,574 | 12/1990 | Karube | 372/102 |
| 5,095,492 | 3/1992 | Sandstrom | 372/102 |

*Primary Examiner*—Leon Scott, Jr.
*Attorney, Agent, or Firm*—William J. Streeter; Wanda K. Denson-Low

[57] ABSTRACT

The present invention provides various embodiments of laser systems for generating "chirp" signals. In the broadest sense, a diffraction grating is placed within a laser cavity on the face of a carrier and the motion of the carrier in its own plane causes the laser to chirp. Typically, the diffraction grating is placed in the end-reflector position of the optical path of the resonant cavity associated with the laser. By putting the diffraction grating on the outer peripheral rim of a wheel and rotating the wheel, a sequence of either up-chirp or down-chirp signals can be generated continuously. Similarly, the desired "chirped" signals can be generated by using a diffraction grating oriented radially on the face of a rotating wheel. The system also contemplates the simultaneous generation of both an up-chirp signal of one polarization and a down-chirp signal of an orthogonal polarization by using a pair of lasers and a single wheel carrying the diffraction grating on either its outer peripheral rim or its face disposed in the end-reflector positions of the lasers for simultaneously generating both the up-chirp and down-chirp signals. An optical system including a reflective mirror, a one-half waveplate, and a polarizing beamsplitter are provided at the output of the two laser system for combining the up-chirp signal and down-chirp signal for simultaneous outputting.

28 Claims, 4 Drawing Sheets

DIFFRACTION GRATING DRIVEN LINEAR FREQUENCY CHIRPED LASER

BACKGROUND OF THE INVENTION

1. Field of the Invention

The present invention relates generally to linear frequency chirped lasers, and more particularly to a linear frequency chirped laser system that is diffraction grating driven.

2. Description of the Prior Art

The most common system used in the prior art to produce "chirping" uses an electro-optic crystal within the laser resonator. An increasing voltage applied to the crystal causes its index of refraction to change, changing the optical length of the resonator cavity and causing the resonator's longitudinal modes to tune.

The specifics of such a prior art system will be discussed for waveguide $CO_2$ lasers. The disadvantages and problems of the prior art include, but are not limited to, the following. The electro-optic crystals are typically cadmium telluride (CdTe) having dimensions of 2 mm'2 mm in cross-section and 5 cm long. The crystals must be polished on all surfaces, with the 2 mm×2 mm ends being of optical quality and including antireflection coatings. The electro-optic crystals of cadmium telluride are very expensive and very fragile.

The electro-optic effect requires a ramp of 0–1600 volts across the 2 mm crystal width. The ramp must be very accurately linear, and it must be typically swept in 3 to 30 $\mu$sec. This is a difficult requirement combining both high voltages and radio frequencies (RF). Furthermore, the crystal has an index of refraction of 2.7 so its optical length is 13.5 cm. This length, plus the length for the laser gain, requires that the laser resonator free spectral range (FSR) is limited to 500 MHz, and the laser cannot reach the chirp amplitude of 1 GHz desired for some applications without adding longitudinal mode suppression to an already very complex device. The present invention adds less than 2 cm to the optical length of the laser, so the laser can easily reach the 1 GHz chirp amplitude.

The electrode connections must be made between two of the 2 mm×5 cm faces of the crystal and the high voltage RF power must not arc to other parts of the crystal holder or flash-over from one electrode to the other.

Residual strain in the crystal or strain induced by the crystal holder causes transverse variations in the index of refraction, which distorts the optical beam and leads to optical loss within the resonator and a degraded beam quality of the laser output. The strain also causes birefringence, which converts one polarization of the light into another. This causes further optical distortions because the electro-optic effect is different for the different polarizations. It also increases the optical losses because some of the optical components will be polarization selective (the spectral line-selecting diffraction grating, for example, and possibly the waveguide bore).

Electro-optic crystals are also piezoelectric, so the applied voltage ramp also causes a dimensional change. Because the voltage ramp occurs rapidly, a spectrum of acoustic waves are generated within the crystal. The acoustic energy will fracture the crystal if it is not removed. Even if attenuated enough so that fracture of the crystal will not occur, the acoustic energy will still induce dynamic strain-optic effects. Therefore, this energy must be removed to a very high degree of completeness.

The crystal also absorbs some optical power, which shows up as heat that must also be removed. The heat input is not uniform across the crystal, but is proportional to the optical intensity, which is most intense on the optical axis, farthest from the cooling walls. The absorbed power sets up a temperature gradient within the crystal, which causes index of refraction gradients and mechanical strains, which in turn cause strain-optic effects. These effects limit the circulating optical power and the achievable laser power and beam quality.

The electro-optic crystal must be aligned with the waveguide bore to within very exacting tolerances in both offset and angle or the insertion losses of the modulator become very large and the optical quality of the laser output drops. This requires a precision adjustable crystal holder and a very difficult alignment procedure. The crystal holder must also absorb the acoustic energy, route the high voltage RF, and provide the cooling, all without straining the crystal. The very best electro-optic modulators should have insertion losses of about 6% round-trip, and more typically they are about 10%. The present invention has an insertion loss of less than 1% round-trip.

The chirp linearity and repeatability limit the resolution of a radar system using a chirped laser transmitter. The linearity of the electro-optic driven chirp depends mainly on the linearity of the voltage ramp with time and the piezo-electric/strain-optic dynamic disturbances in the index of refraction. Other effects such as the thermal and strain-induced index of refraction gradients and birefringence will also contribute to non-linearities in the resulting optical frequency chirp. Similarly, the repeatability of the chirp slope depends not only on the repeatability of the voltage drive, but also on the dynamic strain-optic effects and the temperature dependence of the electro-optic coefficient. The prior art systems can keep deviations from linearity of the chirp ramp to 1% of the chirp amplitude, and the value of the chirp slope can be maintained constant within approximately 1% from chirp-to-chirp. The present invention very significantly improves these numbers by at least a factor of 100? The system of the present invention solves substantially all of the problems of the prior art while avoiding its shortcomings.

BRIEF SUMMARY OF THE INVENTION

A frequency modulated radar transmitter with a repetitive linear increase or decrease in frequency with time (called a "frequency chirp") is required for many radar applications. This invention provides a very simple way of obtaining such a "chirped" frequency modulation for laser radar transmitters. The system of the present invention can generate wider, faster, more linear, and more repeatable chirps than the prior art, and therefore radars made utilizing the concept of the present invention will have higher resolution. The present invention can do this with lower laser internal losses and therefore significantly higher laser output power and better beam quality. The present system is also significantly cheaper to build, easier to maintain, and less prone to failures.

A diffraction grating moving in its own plane imparts a Doppler shift to the diffracted beam. If the diffraction grating is used as the end mirror or end-reflector of a resonator, the Doppler shift is indistinguishable from that due to a mirror changing the resonator's length. In the direction of the resulting diffracted beam, light diffracted off each facet of a diffraction grating has a one wavelength optical path difference from the light diffracted off of adjacent facets. When the grating has moved exactly one groove period in its own plane and its state is indistinguishable from its original state, each facet has moved forward one-half wavelength, and the resonator has tuned through one free spectral range (FSR).

More generally, the moving diffraction grating is not restricted to use as an end-reflector but can be used as any turning or folding optic in the resonator. At these non-end-reflector positions, the grating of course is aligned such that the diffracted beam is in the desired new direction rather than back upon the incident beam. This moving-grating laser chirper is therefore not restricted to ordinary (non-ring) resonators but can be used in ring resonators as well. When used in non-ring resonators in other than the end-reflector position, it interacts with the light on both the forward and reverse passes, which doubles the induced chirp rate.

A simple plane diffraction grating (either transmissive or reflective) moving in its own plane will cause the laser containing it to chirp through successive FSRS. As this continues, the available width of the grating will have passed through the beam path, and if the process is to continue, the grating will have to be stopped and brought back. If the laser is used during this return time, the laser will frequency chirp in the opposite sense from that during the forward grating stroke. This type of action may be useful in some applications, but the reciprocating motion makes it very difficult to drive the grating at a uniform speed to obtain chirps all of the same slope.

Because the grating is moving in its own plane, the reciprocal action can be eliminated by ruling the grating on the rim of a wheel and rotating the wheel to provide the required Doppler shift continuously, without changing the actual location of the grating. Similarly, the diffraction grating can be ruled radially on the planar face of a rotating wheel to provide the required Doppler shift continuously without changing the actual location of the grating.

In one embodiment, the system of the present invention utilizes a diffraction grating on the outer peripheral rim of a rotating wheel disposed within a laser cavity to produce the equivalent of the tuning of the longitudinal modes of the resonator with a moving mirror but without having to eventually stop and reverse direction.

A second embodiment uses a diffraction grating ruled radially on the planar face surface of a rotating wheel to provide the tuning of the longitudinal modes of the resonator.

In one example, a high performance chirp can be made using a 1 GHz frequency ramp in 3 $\mu$sec. Some applications can use lesser requirements of 100 MHz in 30 $\mu$sec. The present invention can far exceed even the high performance requirement set forth above.

These and other objects and advantages of the present invention will be more fully understood after reading the detailed description of the preferred embodiments, the claims, and the drawings, which are briefly described hereinbelow.

DETAILED DESCRIPTION OF THE PREFERRED EMBODIMENT

This application is closely related to my copending application entitled "Phase Plate or Spiral Phase Wheel Driven Linear Frequency Chirped Laser," application Ser. No. 07/871,888, filed Apr. 2, 1992, the same date as this application and assigned to the same assignee, the disclosure of which is incorporated herein.

Figure 1A:
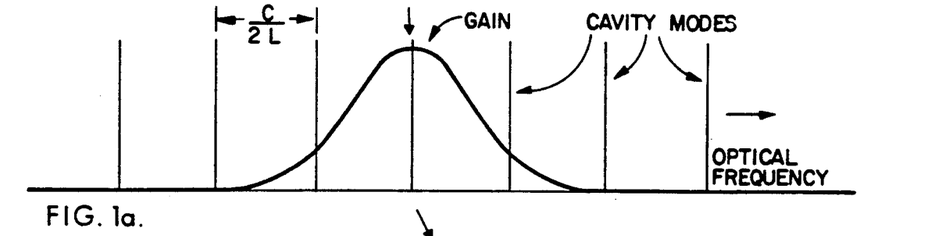
FIGS. 1A, 1B, 1C are graphic illustrations representing the tuning of the longitudinal modes to repetitively sweep out one FSR.
Figure 1B:
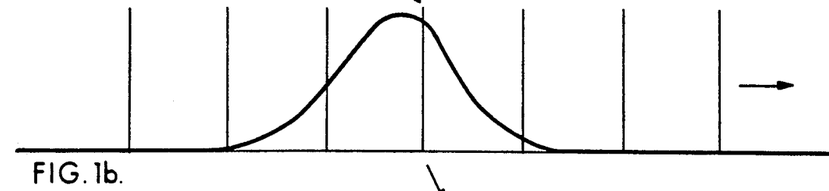
Figure 1C:
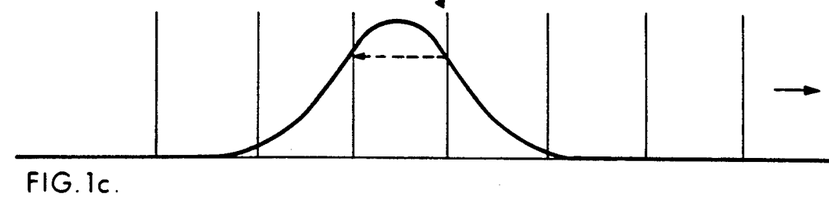

Referring first to the diagrams of FIG. 1A, 1B, and 1C, a laser resonator can operate at any of its longitudinal mode frequencies. Which mode will lase is determined by the gain of the medium—the longitudinal mode at the frequency with the highest gain will lase (for homogeneously broadened gain media as in the $CO_2$ waveguide laser). By moving an end mirror of the resonator or otherwise changing the optical length path of the resonator, the longitudinal modes will tune, and so will the operating frequency of the laser. The laser frequency will follow the longitudinal mode until another longitudinal mode is closer to the gain line center and therefore has a higher gain. The laser will then change to this higher gain longitudinal mode. The tuning range available, called the free spectral range (FSR), is the frequency separation between longitudinal modes and is given by the formula $FSR=c/2L$, where "c" is the velocity of light and "L" is the optical length of the resonator. The FSR is 1 GHz for a 15 cm resonator optical length. The FSR will be swept every time the resonator optical length changes by one-half wavelength. The tuning can be done at essentially any rate because the Doppler shift off of the moving mirror exactly matches the frequency shift of the tuning longitudinal mode, or the element changing the optical length changes the frequency of the light within itself so that emerging light exactly matches the frequency shift of the tuning longitudinal mode.

Figure 2:
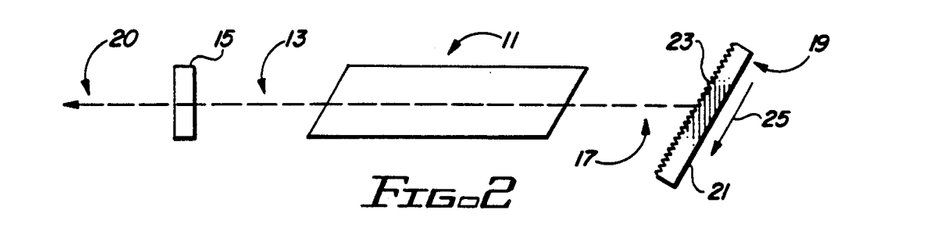
FIG. 2 is a schematic illustration of a generalized embodiment of the present invention.

FIG. 2 shows a first embodiment of the present invention wherein a diffraction grating 19 moving in its own plane imparts a Doppler shift to the diffracted beam. FIG. 2 shows a laser 11 which emits an optical beam 13 within the resonant cavity and along the optical path of the laser. The light beam 13 passes through an output mirror 15 of the laser 11 as output beam 20. At the other end of the laser resonator, beam 13 is designated as beam 17 and is shown as impinging on the face 23 of the moving diffraction grating 19. The diffraction grating 19 is shown as having a base 21 and a face 23, which contains the actual diffraction grating. The arrow 25 shows the direction of movement of the diffraction grating in its own plane.

It will, of course, be recognized by those skilled in the art, that the designation of laser 11 is used herein as a shorthand method for designating anything not actually shown in the laser. Actually, the reference numeral 11 designates the gain media and the term "laser" actually includes the gain media, the resonant cavity, the output mirror, any corrective optics in the optical path, the end-reflector (for non-ring resonators), and any optical devices inserted into the optical path. With this clarified, the gain media will continue to be referred to as the laser, and it is defined to encompass the gain media and any other laser component not expressly shown.

If the diffraction grating is used as the end optic occupying the end-reflector position of a resonator, as in FIG. 2, the Doppler shift caused by the moving grating is indistinguishable from that due to a mirror changing the resonator's length. The light diffracted off of each facet of the diffraction grating 23 in the direction of the resonator axis 17, 13 has one wavelength optical path difference from the light diffracted off of adjacent facets, since that is the manner in which a diffraction grating functions. When the grating has moved exactly one groove period in its own plane, and its state is indistinguishable from its original state, each facet has moved forward one-half wavelength, and the resonator has tuned through one FSR. Because the grating is moving in its own plane, it can be put on the face or rim of a rotating wheel, for example, to provide the required Doppler shift continuously, without changing its actual location, as shown in FIG. 3.

Figure 3:
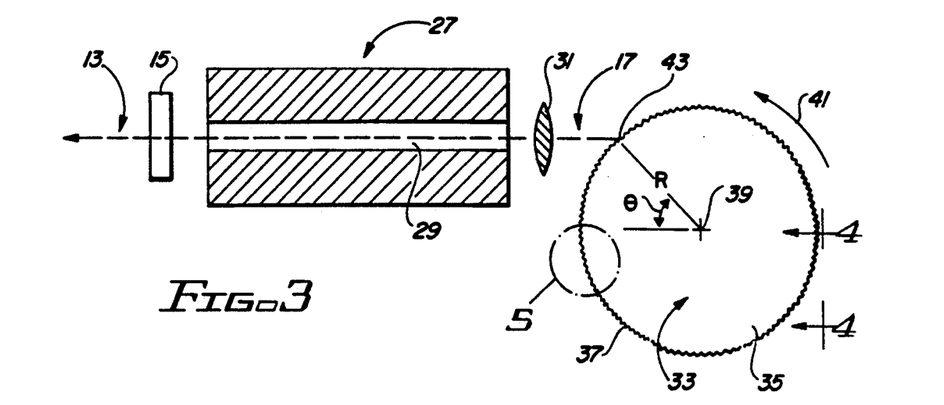
FIG. 3 is a schematic illustration representing another embodiment of the present invention.
Figure 4:
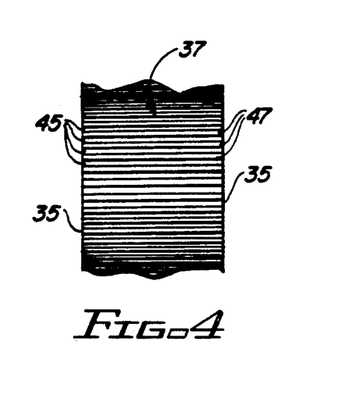
FIG. 4 is a partial end view showing the diffraction grating on the peripheral rim of the wheel of FIG. 3 taken along view lines 4—4 thereof.
Figure 5:
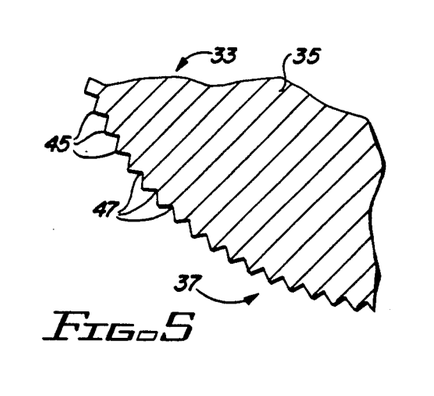
FIG. 5 is a partial schematic illustration of the diffraction grating on the outer peripheral rim surface of the wheel, as blown up from within the circle designated by reference number 5 of FIG. 3.

FIG. 3 shows a waveguide laser 27 having a central waveguide bore 29 wherein the laser 27 emits a laser output beam 13 through output mirror 15. The optical path of the resonator further includes the optical beam 17, which passes through the corrective lens 31 and impinges at a point 43 on the outer peripheral rim surface 37 of a rotating wheel 33 having a pair of opposed, generally planar, circular faces 35. The wheel 33 rotates counterclockwise in a direction shown by the arrow 41 about its axis of rotation 39. As shown in FIGS. 3, 4, and 5, the outer peripheral rim surface 37 includes a diffraction grating thereon. Observe that whatever power is absorbed by the grating is spread out over the "entire peripheral rim 37 of the wheel 33 and is not concentrated on the beam spot area on the grating.

FIG. 4 shows a partial sectional side view of the outer peripheral rim portion 37 of the wheel 33 of FIG. 2 and includes the raised portions or peaks 45 and the depressions or grooves 47 making up the diffraction grating on the surface 37 of the wheel 33. FIG. 5 shows a blown-up partial section of the outer peripheral rim 37 of the wheel 33, as designated within the circle 5 of FIG. 3, and shows a side view of the raised portions 45 and depressions or grooves 47 comprising the diffraction grating on the outer peripheral rim surface 37 of the wheel 33.

Putting the diffraction grating on the outer peripheral rim 37 of the wheel 33 makes the diffraction grating act as a divergent cylindrical mirror, with spherical aberration, instead of as a flat mirror. The spherical aberration is exactly corrected by the cylindrical converging lens 31, which makes all rays arrive at the same angle of incidence at the diffraction grating as shown in FIG. 6.

Figure 6:
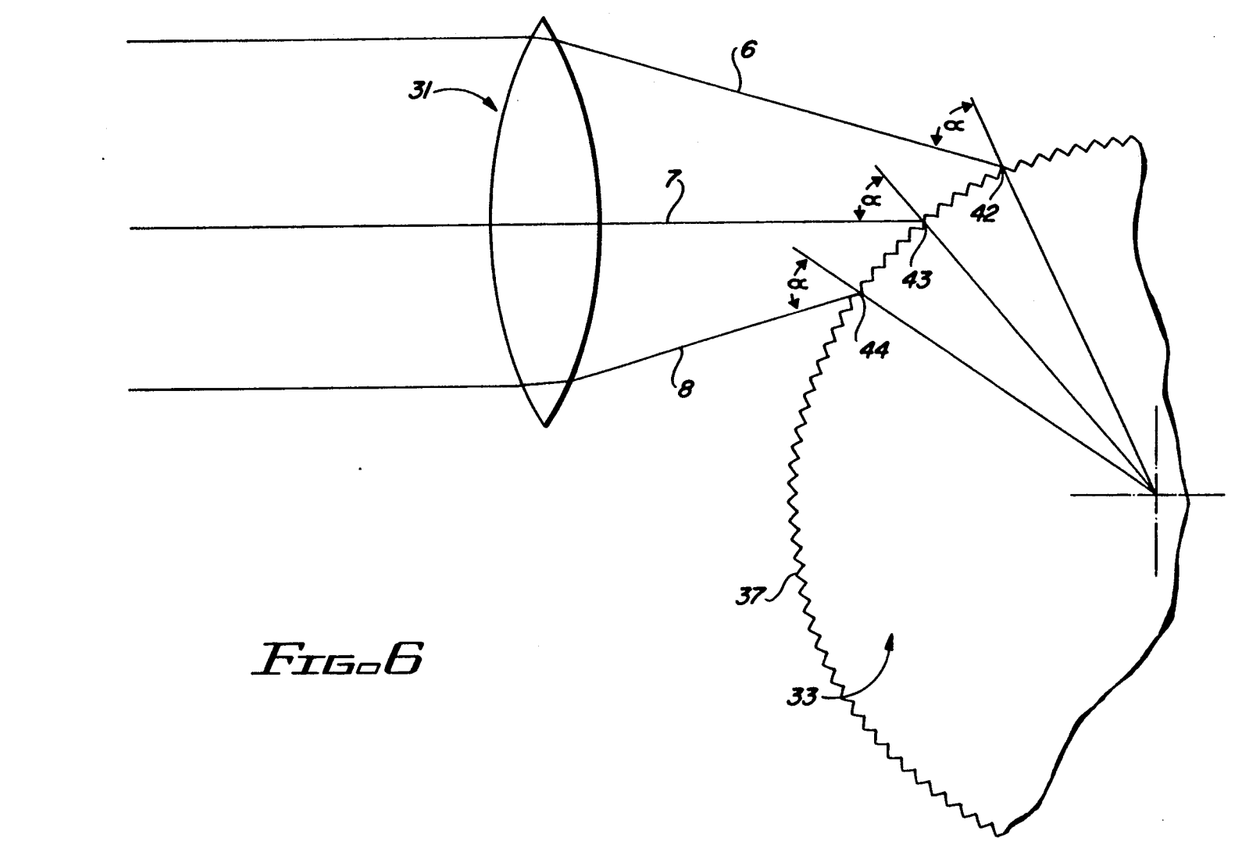
FIG. 6 illustrates how the cylindrical corrector lens eliminates optical aberrations by causing all rays to impinge on the diffraction grating on the outer peripheral rim of the wheel at the same angle of incidence.

FIG. 6 shows the center 7 and two extreme 6, 8 rays passing through lens 31 to arrive at the grating on the rim surface 37 of wheel 33. The central ray 7 impinges at point 43, while the extreme rays 6, 8 impinge at points 42 and 44, respectively. Lens 31 bends the rays such that they all arrive at the grating surface 37 at the same angle of incidence. Each ray is then retrodiffracted to return along its own path. The lens is mainly cylindrical, with some higher order corrections. The required cylinder and corrections do not change as the wheel is rotated, so they can be completely corrected with an appropriately figured lens.

With or without the cylindrical lens, all of the diffracted beam gets the same Doppler shift. After the grating has moved in its own plane one groove spacing, its state is identical to that before the move, and so the state of the diffracted beam must also be identical to that before the grating motion. The phase of the diffracted light at any location must therefore have been changed by exactly one wavelength (or n wavelengths if the diffraction was into the n-th order). Since each grating motion of one groove causes a phase shift of one wavelength, then a grating motion of m grooves per second causes a phase change in the diffracted light of m cycles per second (for a first order diffraction). The Doppler shift due to a diffraction grating moving in its own plane is therefore equal to the velocity of the grating measured in grooves per second.

A specific example is described hereinbelow. For a conventional $CO_2$ laser operating at 10.6 $\mu M$ wavelength, a diffraction grating of 150 lines/mm is used at an angle of incidence of 52.7 degrees. To tune through one FSR in 3 $\mu sec$, the wheel 33 must have a tangential velocity of $(1/150)mm/3 \mu sec = 2.2$ m/sec. If the wheel is 5 cm in diameter, it will rotate at 14 Hz, or 850 rpm. A system like the one shown in FIG. 2 would add less than two centimeters to the overall resonator optical length, compared to 14 cm of optical length required for the electro-modulator, so the "chirp" could be a full 1 GHz and could actually be swept in less than 3 $\mu sec$, depending on the rotation speed and the diameter of the wheel.

For very fast chirps, there might be some problem with the laser's having time to establish a new mode when it switches longitudinal modes as indicated in FIG. 1C. The new mode must build up from random noise and if the chirp is very fast, the chirp might be over before the new mode has had time to come up to significant power. In these cases, a seed laser should be used to establish the new mode above the noise level. The seed beam can be injected into the chirped laser through, for example, the zeroth or other unused order diffraction from the moving grating. The seed frequency should be set slightly higher (for an up-chirp system; slightly lower for a down-chirp system) than the beginning frequency of the operating free spectral range of the chirp. (The moving grating will impart a small Doppler shift, but not a chirp, to the seed beam.) When the chirped laser longitudinal mode reaches the seed frequency, the chirped laser will pick up from the seed beam and chirp from there.

The chirp linearity of this invention depends on the uniformity of the speed of rotation of the wheel during one chirp. It would be very difficult to make a rotating device that was not highly uniform in rotation speed over such a short time. For example, consider a 5 cm diameter wheel that has a mass of only 10 g and is rotating at 14 Hz. To change the rotation speed by 1% during a 3 msec chirp time would require a torque of 0.3 nt-m (0.2 ft-lb). Considering that the motor necessary to drive this device has a torque of only 1/100 of this amount, rotational uniformity during a chirp would probably be better than one part in one million.

Another non-linearity mechanism is mode pulling. The laser does not lase exactly at the frequency of the cavity longitudinal mode but is pulled slightly towards the center of the gain line. How much it is pulled depends on the "Q" of the laser cavity, the frequency of the gain transition, the linewidth of the gain transition, and the tuning of the cavity resonance off the center of the gain line. The majority of the mode pulling is proportional to the tuning of the cavity mode and so does not give rise to a chirp non-linearity. A calculation of the mode pulling for a $CO_2$ laser at 10.6 $\mu$m with a 20 cm laser cavity, a 20% combined loss and output coupling (which gives a "Q" of 100,000), a gain linewidth of $\frac{1}{2}$ GHz, and a tuning over a 1 GHz FSR gives a deviation from linearity of one part in 200,000.

The chirp slope repeatability requirement depends on the signal direction and processing techniques—some schemes require long term repeatability, while other schemes require repeatability only over times of up to 10 $\mu$sec, or a few chirps.

Chirp repeatability will depend on the uniformity of the average groove spacing over the illuminated spot size. This can be held better than 0.01% around the entire circumference of the wheel, and several orders of magnitude better than that over a few chirps. Repeatability also depends on the uniformity of the speed of rotation of the wheel during a revolution and over many revolutions, which can be held below 0.01% long term and several orders of magnitude better than that of a few chirps. Thermal expansion of the groove spacing will effect long term repeatability, but this is less than 0.002%/° C., and can be lowered further with low thermal expansion materials.

Some frequency modulated radar systems require unidirectional chirps while others require up-chirps and down-chirps. The prior art electro-optic devices favor the bidirectional chirps because the electro-optic voltage must be brought back to the starting value, and unidirectional chirps require very fast reset times on the order of 10 nsec to bring the voltage back down from 1600 volts to 0. This invention favors unidirectional chirps.

Some radar schemes require chirp-to-chirp coherence; that is, the optical phase is synchronized from one chirp to the next. The seed injection described above starts each chirp up in phase with the seed laser, so it provides chirp-to-chirp coherence, even if the seed is not needed for rapid initiation of the chirp for short chirp durations.

In situations that require bidirectional chirps, it is often not necessary that the up-chirps and down-chirps alternate on a chirp-by-chirp basis. It is acceptable to alternate a sequence of up-chirps with a sequence of down-chirps, as long as the alternation frequency is fast enough, such as 4 msec of up-chirps followed by 4 msec of down-chirps, with a 1 or 2 msec in between for switching. Such alternation could easily be accomplished with two counter-rotating concentric wheels. The outer wheel would be slotted so that half of the time the inner would be visible and drive one type of chirp, and half of the time the outer would be controlling, driving the other type of chirp. This is the simplest chirp alternation scheme, but there are others that would be obvious in view of the present invention if the chirping and switching times given above are too long.

Figure 7:
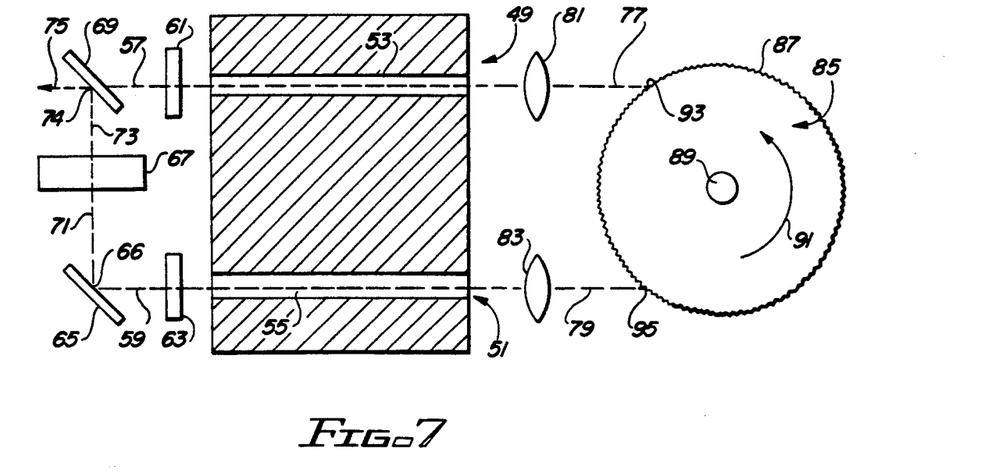
FIG. 7 is a schematic illustration of a laser system for simultaneously generating both an up-chirp and a down-chirp signal using the embodiment of FIG. 3.

FIG. 7 shows a two laser system for generating both an up-chirp and a down-chirp signal simultaneously. FIG. 7 shows the first laser 49 having a waveguide bore 53 and a second laser 51 having a waveguide bore 55. A first laser output 57 passes through an output mirror 61 while the second emitted laser output 59 passes through an output mirror 63. The second beam 59, which represents the down-chirp signal, is then impinged upon and reflected off of the face of a mirror 65 at point 66 as reflected beam 71. Beam 71 is then transmitted through a one-half waveplate optical device 67 as beam 73 and impinged off of a point 74 on the surface of a polarizing beamsplitter device 69. The beamsplitter 69 also passes the output beam 57 of the first laser 49, so that the beams are combined and both the up-chirp signal (represented by the first laser output 57) and the down-chirp signal (represented by the second output laser 59) are combined as the optical output 75 containing both the up-chirp and the down-chirp signals, simultaneously.

A cylindrical corrective lens 81 is disposed within the optical path of the resonator cavity of the first laser 49, and the optical beam 77 passing therethrough is impinged off of a point 93 on the outer peripheral rim 87 of a rotating wheel 85. The wheel 85 rotates counter-clockwise as indicated by the arrow 91 about its axle or shaft 89 comprising its axis of rotation.

The second laser 51 has a cylindrical corrective lens 83 within its optical path, and beam 79 impinges off of point 95 on the outer peripheral surface 87 of the rotating wheel 85. This configuration illustrates how two separate laser systems, or lasers 49 and 51, can use a common rotating wheel 85 having a diffraction grating on its outer peripheral rim surface 87 to generate both an up-chirp signal and a down-chirp signal, simultaneously. The beams are of orthogonal polarizations so they do not interfere with one another, and they are combined at the polarizing beamsplitter 69 and simultaneously outputted as the common output 75.

Figure 8:
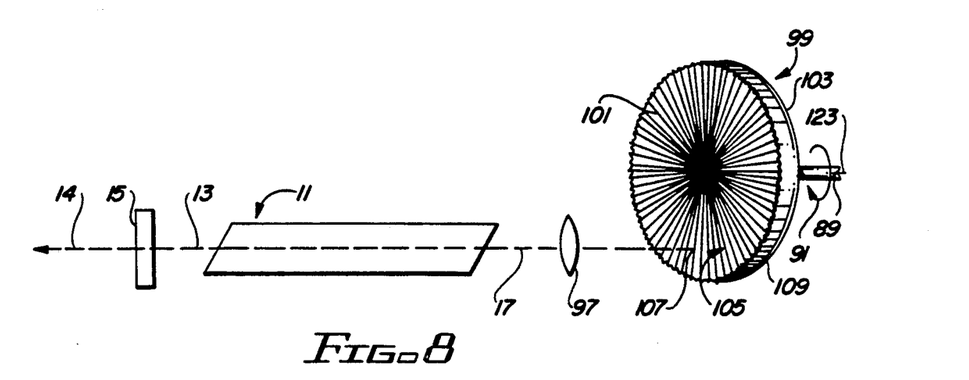
FIG. 8 is a schematic illustration of yet another embodiment of the present invention.
Figure 9:
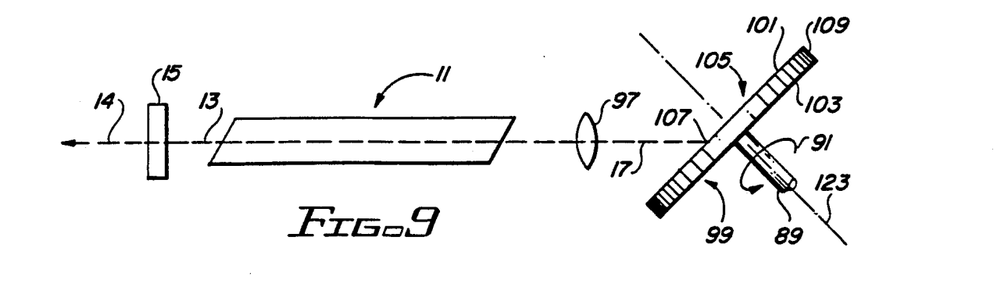
FIG. 9 is a schematic illustration of the embodiment of FIG. 8 viewed from the side angle to show the impingement on the face of the rotating wheel.

FIGS. 8 and 9 represent an alternate embodiment of the system of FIG. 3. Again, a diffraction grating moving in its own plane, as shown in FIG. 1, imparts a Doppler shift to the diffracted beam. If the diffraction grating is used as or in place of the end-reflector or mirror of a resonator, the Doppler shift is indistinguishable from that due to a mirror changing the resonator's length.

In this case, the diffraction grating is ruled radially on the face of a rotating wheel to provide the required Doppler shift continuously, as shown in FIGS. 7 and 8. The diffraction grating on the face of a wheel, however, adds some distortion to the diffracted beam. The grooves closer to the center of the wheel are closer together than those farther out, so there is a small variation in diffracted angle over the horizontal extent of a beam spot size. Also, the angle between the incident beam and the grating grooves changes slightly over the vertical extent of the beam, such that light at the top of the spot is diffracted to the left and light at the bottom of the spot is diffracted to the right. These are all static effects, and so they can be corrected with a corrector plate. One might also expect that since the grooves farther from the center of the wheel are moving faster than those nearer the center, that they might impart a larger Doppler shift to the diffracted beam. However, this is compensated by the change in the diffracted angle caused by variation in groove spacing, so that there is no difference in frequency shift. The frequency shift is simply equal to the number of grooves per second passing any point (for a grating used in first order), which is the same for all radial distances. Note also that whatever power is absorbed by the grating is spread out over the entire path of the beam on the wheel and is not concentrated on the beam spot area of the grating.

FIG. 8 shows a laser 11 emitting a laser output beam 13 which passes through an output mirror 15 as the laser output beam 14. Within the optical path of the laser's resonator, depicted as optical beam 17, is a corrector plate 97, and the beam 17 is shown as impinging at a point 107 on the diffraction grating 105 disposed on the face 101 of a rotating wheel 99. The wheel 99 includes a front surface or face 101, an opposite surface or face 103, an outer peripheral rim portion 109, and an axle or shaft 89 through which the axis of rotation 123 passes. The diffraction grating 105 on the front face 101 of the wheel 99 includes a plurality of radially-oriented, spaced diffraction grooves as previously described. FIG. 9 shows the system of FIG. 8 from a side angle so that the point of impingement 107 of the beam 17 on the face 101 of the wheel 99 is more clearly shown. A specific example will be described herein below.

For a $CO_2$ laser operating at 10.6 $\mu M$ wavelength, a grating of 150 lines/mm is used at an angle of incidence of 52.7 degrees. To tune through one FSR in 3 $\mu sec$, the wheel must have a tangential velocity of (1/150) mm/3 $\mu sec = 2.2$ m/sec. If the wheel is 5 cm in diameter, it must rotate at 14 Hz, or 850 rpm. A system like that shown in FIGS. 8 and 9 would add less than 2 cm to the resonator's optical length, compared to 14 cm of added optical length for the electro-optic modulator, so the chirp would be a full 1 GHz and could actually be swept in much less than 3 $\mu sec$, depending on the rotational speed and the diameter of the wheel. The distortion due to the variation in groove spacing in the radial direction amounts to 1/10 wavelength over a 2 mm spot size. The distortion due to the upper part of the spot being diffracted to the left and the lower portion of the spot being diffracted to the right is 3 wavelengths. These distortions can be easily removed with a single corrector plate.

The chirp linearity of this invention depends on the uniformity of the speed of rotation of the wheel during one chirp. It would be very difficult to make a rotating device that was not highly uniform for the reasons given previously. Another non-linearity mechanism is mode-pulling, and this is identical to that previously described with respect to FIG. 3. The chirp slope repeatability requirement again depends on the radar signal detection and processing techniques used. Some schemes requiring long-term repeatability while others only require repeatability over a few times up to 10 $\mu sec$, or over a few chirps.

Figure 10:
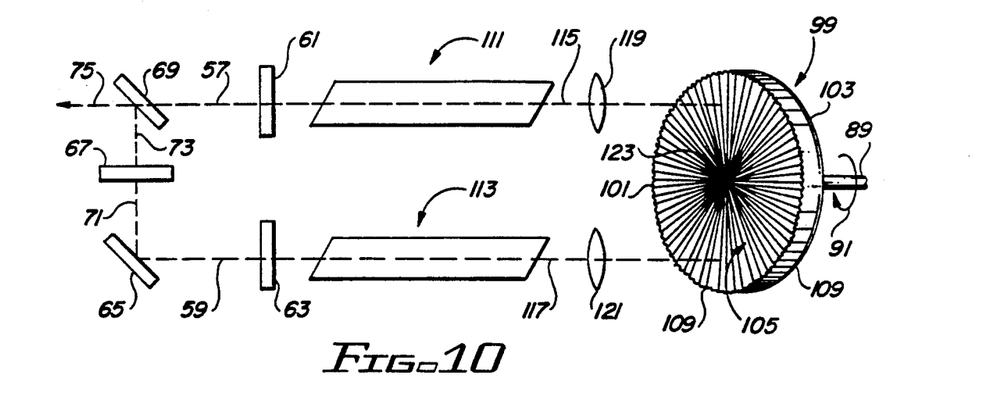
FIG. 10 is a schematic illustration of an alternative to the system of FIG. 7 using the embodiment of FIGS. 8 and 9 therein.

If up-chirps and down-chirps must be within one chirp period of each other, the two-laser system of FIG. 10 could be used. FIG. 10 shows a first laser 111 emitting the laser output signal 57, representing the down-chirp signals, which passes through the output mirror 61 and then passes through a polarizing beamsplitter 69 as one portion of the combined output beam 75. Within the optical path of the resonator cavity of laser 111 is a corrector plate 119 through which the beam 115 passes and impinges upon the diffraction grating 105 which is radially disposed on the face surface 101 of the wheel 99 as a series of radial lines radiating from the center to the outer peripheral edge of the face 101. The wheel 99 rotates in a clockwise direction, as illustrated by the arrow 91, about the rotational axis 123.

A second laser 113 emits a laser output beam 59 representing an up-chirp signal. This signal is passed through an output mirror 63 and reflected off of the face of a mirror 65 as reflected beam 71. Beam 71 passes through a one-half wavelength plate 67 and emerges as beam 73, which impinges on the polarizing beamsplitter 69 to combine with the down-chirp 57 at the combined output 75. Since the up-chirp signal 59 and the down-chirp signal 57 are of orthogonal polarization, they are combined as the output beam 75 without interfering with one another, as conventionally known. The optical path of the resonant cavity of laser 113 also includes a corrector plate 121 through which the optical beam 117 passes to impinge upon an opposite and adjacent portion of the diffraction grating 105 of the face plate 101 of the wheel 99 opposite the point at which the beam 115 of the first laser 111 impinges.

The system of FIG. 10 will, therefore, transmit both up-chirps and down-chirps simultaneously. In practice, both lasers 111 and 113 could not run off of the same diffraction grating because it would be extremely difficult to shape the grooves for high efficiency for both directions of illumination. One laser could run off of one ring of radial grooves blazed for its direction of illumination, and the other laser could run off of a concentric ring of grooves blazed for the other direction. Alternatively, one grating could be on top of the wheel and the other on the bottom; or for a pedestrian solution, two separate wheels could be used. The two outputs with orthogonal polarizations are combined by the polarizing beamsplitter 69. The half waveplate could be eliminated by folding the path out of plane to rotate the plane of polarization, or one could start with the lasers initially in orthogonal polarizations.

Another method of transmitting up- and down-chirps simultaneously is to run the two lasers of FIG. 7 or FIG. 10 on different spectral lines and combine the two output beams with a diffraction grating or a prism.

The present invention does not teach simply the first and second embodiments utilizing a diffraction grating placed on the outer peripheral rim of a wheel or a grating radially disposed on one of the planar faces of a wheel, but more generally teaches the use of a diffraction grating moving in its own plane to cause a laser to "chirp". Any ordinary diffraction grating moving in its own plane will cause chirping, but eventually, one reaches the end of the grating and has to stop and pull it back. Putting the diffraction grating on a wheel is simply one means to continuously generate chirps without the necessity of having to bring the grating back. The wheel also makes it easier to maintain a uniform grating velocity, the velocity determining the chirp rate of change of frequency. An endless loop or belt could also be used to carry a diffraction grating moving in its own plane and other possibilities will occur to those of ordinary skill in the art given Applicant's disclosure herein.

Even the ordinary diffraction grating, with its limited duration of continuous chirping, may have applications as a radar chirper in some areas. If 10,000 chirps are required, they could be obtained with systems of the prior art by shortening the laser cavity by moving the end mirror or grating along the optical axis for 10,000 half wavelengths, or 5 cm for a 10.6 μn wavelength $CO_2$ laser. That is, the laser cavity is shortened (or lengthened for down-chirps) by 5 cm. It may not be possible to change the laser cavity by this much for many lasers, particularly waveguide lasers, where such length change would increase the optical losses and the laser would extinguish. But a diffraction grating slid along its own plane a distance such that the component of the motion along the laser axis is the required "shortening" will cause the same number of chirps without any real change in the cavity length. For a 10.6 μM wavelength $CO_2$ laser used with a 150 line/nun diffraction grating, the actual grating motion in its own plane would be 6.7 cm for the grating to be moved 10,000 of its own groove spacings.

It will be understood by those skilled in the art that various modifications, changes, variations, substitutions, and alterations can be made in the systems, methods, and apparatus of the present invention without departing from the spirit and scope thereof, which is limited only by the appended claims.

What is claimed is:

1. An improved laser system including at least first and second lasers for simultaneously emitting first and second output beams corresponding to an up-chirp signal and a down-chirp signal, respectively, each of said first and second lasers including a laser cavity having an optical path and an optical beam circulating along said optical path, said laser system comprising:
   a wheel having an outer peripheral rim at least partially disposed in each of the optical paths of said first and second laser cavities;
   means for rotating said wheel;
   diffraction grating means disposed on the outer peripheral rim of said wheel;
   means for impinging the optical beams on said diffraction grating means as said wheel rotates and moves said grating means for producing said up-chirp signal and said down-chirp signal without any real changed in the cavity length of said laser cavities;
   each of said laser cavities including an output location having an output mirror, the output location or said second laser further including a mirror for reflecting the output beam corresponding to one of said up-chirp signal and said down-chirp signal;
   a polarizing beamsplitter means disposed at the output location of said first laser cavity for passing said first laser-emitted output beam corresponding to the other of said up-chirp signal and said down-chirp signal; and
   a one-half waveplate disposed in the path of the reflected beam from said mirror at the output of said second laser to the polarizing beamsplitter at the output of the first laser for combining the second signal with the first signal to form a combined laser output for simultaneously outputting both said up-chirp signal and said down-chirp signal without interference therebetween since each of said output signals has an orthogonal polarization from the other.

2. An improved laser system including at least first and second lasers for emitting first and second output beams corresponding to an up-chirp signal and a down-chirp signal, respectively, each of said first and second lasers including a laser cavity having an optical path and an optical beam circulating along the optical path of each said laser, said laser system for generating both said up-chirp signal and said down-chirp signal simultaneously comprising:
   a wheel having a planar face disposed such that at least a portion of said face is disposed in each of said first and second laser cavities;
   diffraction grating means disposed radially on the face of said wheel;
   means for rotating said wheel;
   means for impinging the optical beams on said diffraction grating means as said wheel rotates and moves said grating means for producing said up-chirp signal and said down-chirp signal without any real change in the cavity length of said laser cavities;
   first and second output optical means at the output of said first and second lasers for passing a first output signal corresponding to one of said up-chirp signal and said down-chirp signal and a second output signal corresponding to the other of said up-chirp signal and said down-chirp signal, respectively;
   third output optical means for reflecting the second output signal from the second laser, a polarizing beamsplitter means disposed in the optical path at the output of the first laser for passing the first output signal therethrough; and
   a half waveplate means disposed in the path of the second output signal reflected from said third optical means at the output of said second laser for impinging the reflected second output signal onto the polarizing beamsplitter means and combining the second output signal with the first output signal to produce a combined output of the simultaneously generated up-chirp and down-chirp signals having orthogonal polarizations without interference between one another.

3. A system for generating a chirped laser signal comprising:
   a laser for outputting an output beam;
   said laser having a resonant cavity having an optical path,
   a generated optical beam that travels along said optical path within said resonant cavity;
   a circular wheel disposed in the optical path within said resonant cavity, said wheel having an outer peripheral rim portion;
   diffraction grating means disposed on the outer peripheral rim portion of said wheel;
   means for rotating said wheel; and
   means for impinging said generated optical beam on the diffraction grating means on the peripheral rim portion of said rotating wheel for shifting the frequency of the optical beam and generating said chirped laser signal without any real change in the resonant cavity length.

4. The system of claim 3 further including a corrective optical means for compensating for system optical errors introduced by the use of a curved diffraction grating.

5. The system of claim 4 wherein said corrective means causes all rays to impinge on the diffraction grating means at the same angle of incidence.

6. A system for generating a chirped laser signal comprising:
   a laser for emitting an output beam;

said laser having a resonant cavity having an optical path, a generated optical beam that travels along said optical path within said resonant cavity;

a circular wheel disposed in said resonant cavity, said wheel including at least one planar face;

diffraction grating means disposed on said at least one planar face of said wheel as a series of radial lines carried thereby;

means for rotating said wheel; and means for impinging said generated optical beam onto the diffraction grating means on the face of said rotating wheel for shifting the frequency of the optical beam and generating said chirped laser signal without any real change in the resonant cavity length.

7. The system of claim 6 further including optical corrective means for compensating for system optical errors introduced by the use of a radial diffraction grating.

8. A laser system for simultaneously generating both an up-chirp signal and a down-chirp signal comprising:

a first laser means for generating a first output beam comprising one of said up-chirp signal and said down-chirp signal, said first laser means having a first resonant cavity and a first optical beam circulating within said first resonant cavity;

a second laser means for generating a second output beam comprising the other of said up-chirp signal and said down-chirp signal, said second laser means having a second resonant cavity and a second optical beam circulating within said second resonant cavity;

a wheel having an outer peripheral rim, a first portion of said outer peripheral rim being disposed in said first resonant cavity and a second portion of said outer peripheral rim being disposed in said second resonant cavity;

a diffraction grating disposed on the outer peripheral rim of said wheel;

means for rotating said wheel;

said first optical beam impinging on the diffraction grating on said first portion of the outer peripheral rim of said rotating wheel and said second optical beam impinging on the diffraction grating on the second portion of said outer peripheral rim of said rotating wheel for generating said up-chirp signal and said down-chirp signal without any real change in the cavity length of said laser cavities; and optical means for combining said first and second output signals for simultaneously outputting both said up-chirp signal and said down-chirp signal.

9. The system of claim 8 further including a first output mirror at the output of said first laser means for outputting one of said up-chirp signal and said down-chirp signal having a first polarization and a second output mirror operatively disposed in the optical path at the output of the second laser for outputting the other of said up-chirp signal and said down-chirp signal having the same polarization as said first signal.

10. The system of claim 8 wherein said optical means for combining said first and second output signals comprises a reflective mirror operatively disposed in the optical path at the output of said second laser means for reflecting the second laser output beam;

a polarizing beamsplitter disposed in the optical path of the first laser means at the output thereof;

a half waveplate means disposed in the optical path between the mirror at the output of the second laser means and the polarizing beamsplitter at the output of the first laser means for passing the second output beam reflected from said mirror, converting to the orthogonal polarization, and impinging same on said polarizing beamsplitter, thereby combining said first and second output signals to form a common output of the simultaneously generated said up-chirp signal and said down-chirp signal without interference with each other.

11. A laser system for simultaneously generating both up-chirp and down-chirp signals comprising:

a first laser means for generating a first output beam comprising one of said up-chirp and down-chirp signals, said first laser means having a first resonant cavity, a first optical beam traveling along the optical path of said first resonant cavity, and a first output coupling means for emitting said first output beam;

a second laser means for generating a second output beam comprising the other of said up-chirp and down-chirp signals, said second laser means having a second resonant cavity, a second optical beam traveling along the optical path of said second resonant cavity, and a second output coupling means for emitting said second output beam;

a wheel having a planar face, a portion of the planar face of said wheel being disposed in the first resonant cavity and another portion of the face of said wheel being disposed in the optical path of the second resonant cavity;

diffraction grating means disposed as a plurality of radial lines on the face of said wheel;

means for rotating said wheel;

said first laser means impinging said first optical beam on the diffraction grating means on the first portion of the face of said rotating wheel and the second laser means impinging said second optical beam on the diffraction grating means on the second portion of the face of said rotating wheel for producing said up-chirp and said down-chirp signals without any real change in the cavity length of said laser cavities; and optical means for combining the up-chirp signal and down-chirp signal output for simultaneously outputting same.

12. The system of claim 11 wherein said optical means for combining the up-chirp signal and down-chirp signal comprises a reflective mirror operatively disposed in the optical path at the output of said second laser means for reflecting the second laser output beam;

a polarizing beamsplitter disposed in the optical path of the first laser means at the output thereof;

a half waveplate means disposed in the optical path between the mirror at the output of the second laser means and the polarizing beamsplitter at the output of the first laser means for passing the second output beam reflected from said mirror, converting to the orthogonal polarization, and impinging same on said polarizing beamsplitter thereby combining said first and second output signals to form a common output of the simultaneously generated said up-chirp signal and said down-chirp signal without interference with each other.

13. The system of claim 12 further including a first optical corrective means disposed in the optical path within said first laser means and a second optical corrective means disposed in the optical path within said second laser means, both said first and second optical corrective means including a corrector plate.

14. A laser system for simultaneously generating both up-chirp and down-chirp signals, one of said signals having a first polarization nd the other of said signals having a polarization orthogonal thereto, said system comprising:
   a first laser means for generating a first output beam comprising one of said up-chirp and down-chirp signals, said first laser means having a first resonant cavity and an optical beam circulating within said first resonant cavity;
   a second laser means for generating a second output beam comprising the other of said up-chirp and down-chirp signals, said second laser means having a second resonant cavity and an optical beam circulating within said second resonant cavity;
   a wheel having at least a face surface and an outer peripheral rim surface, said wheel being oriented such that a first portion of one of said surfaces is operatively disposed in one of said first and second resonant cavities and another portion of said one of said surfaces is operatively disposed in the other of said first and second resonant cavities;
   a diffraction grating disposed on said one of said surfaces of said wheel;
   means for rotating said wheel;
   said first and second optical beam impinging on opposite ones of said first and second portions for generating said up-chirp and down-chirp signals without any real change in the cavity length of said laser cavities;
   optical means at the output of one of said first and second laser means for changing the polarization of one of said up-chirp and down-chirp signals to an orthogonal polarization; and
   means for combining said signals and simultaneously generating both said up-chirp signals and down-chirp signals without interference therebetween.

15. The system of claim 14 wherein said combining means includes a polarization beamsplitter.

16. The system of claim 14 wherein said combining means includes transmitting both of said signals side by side and enabling them to diffract into each other.

17. The system of claim 14 wherein said optical means includes a quarter-wave plate means for making the polarization of one of said up-chirp and down-chirp signals orthogonal to that of the other of said up-chirp and down-chirp signals by passing it through said quarter wave plate means.

18. The system of claim 14 wherein said optical means includes a plurality of fold mirrors for making the polarization of one signal orthogonal to that of the other by geometrically rotating same by use of said fold mirrors.

19. A method for generating a chirped laser signal comprising the steps of:
   providing a laser having a laser resonant cavity;
   generating an optical laser beam within said laser resonant cavity;
   carrying a diffraction grating on the outer peripheral rim of a wheel;
   positioning the wheel in the laser's resonant cavity;
   rotating said wheel;
   impinging the generated optical beam within said laser cavity on the rotating diffraction grating; and thereby chirping the laser's frequency for producing a chirped output signal without any real change in the cavity length of said laser cavity.

20. A method for generating at least one of an up-chirp and a down-chirp signal in a laser system including a laser for generating an output beam, said laser having a resonant cavity and a generated optical beam circulating along the optical path of said resonant cavity, said method including the steps of:
   providing a wheel;
   disposing a radially-oriented diffraction grating on one of the faces of said wheel;
   orienting the grating-bearing face of said wheel such that the diffraction grating is disposed in said resonant cavity;
   rotating the wheel; and
   impinging th generated optical beam on the diffraction grating carried by the face of the wheel to tune the longitudinal modes of the resonant and generate at least one of an up-chirp and down-chirp signal without any real change in the cavity length of said laser cavity.

21. A method for generating at least one of an up-chirp signal and a down-chirp signal in a laser system including a laser for outputting an output beam, said laser having a resonant cavity and a generated optical beam circulating within said cavity, said method comprising the steps of:
   disposing a diffraction grating on the outer peripheral rim of a wheel;
   orienting the outer peripheral rim of the wheel such that said diffraction grating is disposed in said laser cavity;
   rotating the wheel; and
   impinging the optical beam onto the diffraction grating carried on the outer peripheral rim of the rotating wheel for tuning the longitudinal modes of the resonator and generating said at least one of an up-chirp and a down-chirp signal without any real change in the cavity length of said laser cavity.

22. A method for generating a chirped signal in a laser system including a laser for generating a laser output beam, said laser having a resonant cavity, said method comprising the steps of:
   disposing a diffraction grating within said resonant cavity;
   moving said carrier so that said diffraction grating is moved in its own surface in a direction perpendicular to the lines of said diffraction grating; and
   impinging the laser beam on said diffraction grating to cause the longitudinal modes of the resonant to tune and said chirped signal to be generated without any real change in the cavity length of said laser cavity.

23. An improved laser system for generating an up-chirp signal or a down-chirp signal, said laser system including a laser for emitting an output beam, said laser having a laser cavity and an optical beam circulating along an optical path within said cavity, said laser system comprising:
   a diffraction grating disposed in the optical path within said cavity;
   planar means for carrying said diffraction grating;
   means for translating said carrying means so that said diffraction grating is moved in the plane of said diffraction grating in a direction perpendicular to the lines of said diffraction grating without any real change in the cavity length; and means for impinging the optical beam on the moving diffraction grating for generating said up-chirp signal or said down-chirp signal.

24. An improved laser system for generating an up-chirp signal or a down-chirp signal, said laser system including a laser for emitting an output beam, said laser having a laser cavity and an optical beam circulating along an optical path within said cavity, said laser system comprising:
- a diffraction grating disposed in the optical path within said cavity;
- cylindrical means for carrying said diffraction grating;
- means for rotating said carrying means so that said diffraction grating is rotated in a cylindrical path in a direction perpendicular to the lines of said diffraction grating without any real change in the cavity length; and
- means for impinging the optical beam on the rotating diffraction grating for generating said up-chirp signal or said down-chirp signal.

25. The improved laser system of claim 24 further including corrector lens means disposed in said optical path for compensating for system optical errors.

26. The improved laser system of claim 25 wherein said corrective lens means causes all rays to impinge on said diffraction grating at the same angle of incidence.

27. An improved laser system for generating an up-chirp signal or a down-chirp signal, said laser system including a laser for emitting an output beam, said laser having a laser cavity and an optical beam circulating along an optical path within said cavity, said laser system comprising:
- a radial diffraction grating disposed in the optical path within said cavity;
- planar means for carrying said diffraction grating;
- means for rotating said carrying means so that said radial diffraction grating is rotated about its center in the plane of said diffraction grating without any real change in the cavity length; and
- means for impinging the optical beam on the rotating diffraction grating for generating said up-chirp signal or said down-chirp signal.

28. The improved laser system of claim 27 further including corrector plate means disposed in the optical path for compensating for optical aberrations caused by the use of a radial diffraction grating.

* * * * *